C. W. SNYDER.
PIPE COUPLING.
APPLICATION FILED NOV. 21, 1918.
1,299,047.
Patented Apr. 1, 1919.
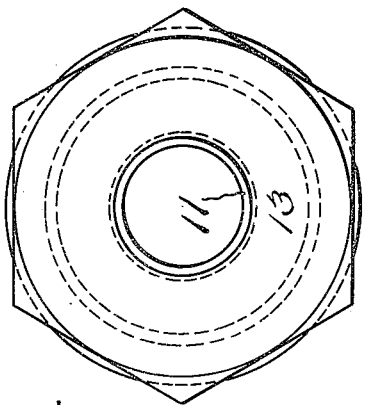
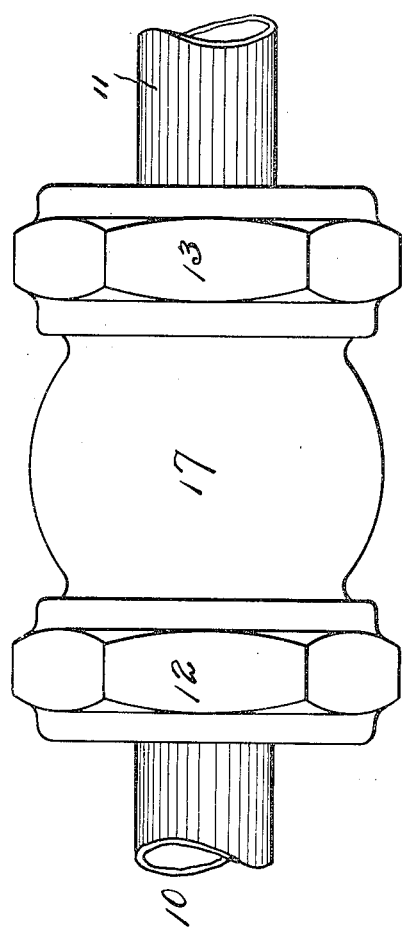
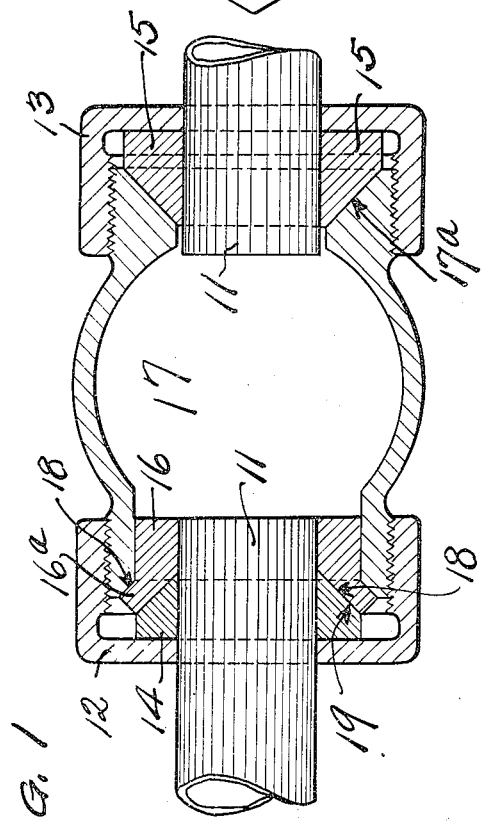
Charles W. Snyder
Inventor
By N. E. Gee
Attorney

UNITED STATES PATENT OFFICE.

CHARLES W. SNYDER, OF ALTOONA, PENNSYLVANIA.

PIPE-COUPLING.

1,299,047. Specification of Letters Patent. Patented Apr. 1, 1919.

Application filed November 21, 1918. Serial No. 263,544.

*To all whom it may concern:*

Be it known that CHARLES W. SNYDER, a citizen of the United States, residing at 2329 Beale Ave., Altoona, in the county of Blair and State of Pennsylvania, has invented certain new and useful Improvements in Pipe-Couplings, of which the following is a specification.

This invention relates to pipe couplings, and has special reference to a device that may be readily used in emergency cases such as when pipes have bursted through freezing or other unusual causes.

A principal object of this invention is to provide a pipe coupling or union that may be readily placed in position in the pipe without cutting threads on the ends thereof, or without leading the pipe to place the coupling thereon. Accordingly, a pipe coupling is contemplated which is adapted to be easily placed on the pipe in such manner as to form a serviceable union in a fraction of the time usually required to repair a broken pipe, using the available means now usually at the disposal of the ordinary plumber.

A further object of this device is to provide clamping means on the ends of the pipe which are adapted to coöperate in such a manner as to make a perfectly tight joint against such pressures as are usually found in city water pipe lines.

With these and other objects in view, which will be further brought out, the invention consists in the novel construction, combination and arrangement of parts as will be fully pointed out, illustrated and claimed.

Although the invention is susceptible to some structural changes or modification without departing from the spirit or scope thereof, a preferred and practical embodiment thereof is shown in the accompanying drawings, in which:

Figure 1 is a longitudinal section view through the pipe coupling, showing the pipe ends in their respective location.

Fig. 2 shows a plan view of the parts shown in Fig. 1.

Fig. 3 shows an end elevation of the parts shown in Fig. 1.

Similar reference numerals refer to similar parts throughout the several figures of the drawings.

In applying this pipe coupling to a ruptured or broken pipe, it is first necessary to cut a section out of the pipe equal to approximately twice the pipe diameter, whereby the removal of the damaged section will display the ends designated by the numerals 10 and 11.

In applying this union to a pipe the coupling nuts 12 and 13 are first placed on the ends of the pipes 10 and 11 respectively, after which a resilient member, such as rubber, or a composition of the same, designated by the numerals 14 and 15, are placed on the pipe ends 10 and 11 respectively.

After the packing rings and clamping nuts have been placed on the pipe ends, a filler ring 16 may be placed on one of the pipes as shown in Fig. 1, the same being adapted to coöperate with the relative large open end of the coupling body 17, the opposite end of which latter is provided with the interior bevel or cone face 17$^a$. The said filler ring 16 is preferably provided with a flange 16$^a$ for abutting against the beveled edge 18 of the relatively large open end of the body 17, and this filler ring also has a bevel face 19 for coöperating with the yielding washer 14. Accordingly, it will be apparent that the body 17 is in effect provided at each end with an interior bevel for the purpose of coöperating with a similarly inclined washer face, whereby when the washers are placed under compression by the clamping rings 12 and 13 respectively they will be compressed into the annular cavities formed by the bevels to provide a water tight joint. It will be noted however that the combination shown has the advantage of providing for the coupling of pipes of similar section through the use of the filler ring 16, but owing to the fact that the said ring is entirely independent and separable from the body 17, by placing a ring of smaller gage into the opening a pipe of larger diameter may be accommodated by this end of the coupling, preserving however, the advantages of the interior bevel or cone faces of the combination shown in the drawings.

After the clamping nuts 12 and 13 have been placed on the respective pipe ends and the yielding washers 14 and 15 have also been put in position, the filler ring 16 may be fitted over the pipe end 10 and then the body 17 may be fitted over the ring 16 by sliding the entire clamping nut, packing ring and filler ring placed on to the pipe 10 a sufficient distance to permit the opposite end of the coupling body to clear the end of the pipe 11 by inserting the body diagonally between the ends of the pipes 10 and 11. Obviously, after the coupling body 17 has cleared the pipe 11 all the parts assembled on the pipe 10 including the body 17 may be shifted forward to meet the clamping nut 13 and yielding ring 15 assembled on the pipe section 11.

Having thus described the invention what I claim and desire to be secured by Letters Patent, is:—

1. A pipe coupling including a body member, a metallic ring adapted to coöperate with one end of the body member, and fit snugly therein, a beveled annular portion on the ring adapted to coact with a similar bevel portion on the end of the body, a resilient member adapted to coact with the ring and a clamping nut adapted to force the resilient member down on the pipe.

2. A pipe coupling, including a body member having a spherical center portion, truncated and threaded at each end, clamping nuts adapted to coact with the threaded ends, a beveled resilient ring adapted to coact with the clamping nut, an inwardly inclined beveled portion on the truncated end, adapted to coact with the clamping nut to force a resilient ring down on the pipe, a filler ring positioned in one end of the body member and having outwardly flaring beveled edges, one of which coacts with a similar bevel on the end of the body portion, while the other coöperates with a similar bevel on the resilient ring, and a clamping nut designed to force the resilient member around the pipe.

3. A pipe coupling included a body provided at one end with an interior bevel and exterior threads, a yielding packing washer having a cone face, and a clamping nut for engaging said threads and forcing the cone face of the washer against the said interior bevel, and the other end of said coupling body being formed with a relatively large opening, a filler ring adapted to fit in said opening and having means for abutting with the end of the pipe body to prevent its being pushed within the same and also having a bevel face, a resilient washer adapted to coöperate with said beveled face of the filler member, and a clamping nut for engaging the exterior of the coupling body, and also the yielding washer.

In testimony whereof I affix my signature.

CHARLES W. SNYDER.